(12) United States Patent
Pribula et al.

(10) Patent No.: US 6,932,527 B2
(45) Date of Patent: *Aug. 23, 2005

(54) CARD CARTRIDGE

(75) Inventors: Martin A. Pribula, Eden Prairie, MN (US); James R. Meier, Falcon Heights, MN (US); Stacy W. Lukaskawcez, Shakopee, MN (US); Anthony L. Lokken, Eden Prairie, MN (US); Gary A. Lenz, Eden Prairie, MN (US); Jeffrey D. Upin, Edina, MN (US); Gary M. Klinefelter, Eden Prairie, MN (US)

(73) Assignee: Fargo Electronics, Inc., Eden Prairie, MN (US)

( * ) Notice: Subject to any disclaimer, the term of this patent is extended or adjusted under 35 U.S.C. 154(b) by 311 days.

This patent is subject to a terminal disclaimer.

(21) Appl. No.: 10/126,441

(22) Filed: Apr. 19, 2002

(65) Prior Publication Data

US 2003/0152409 A1 Aug. 14, 2003

Related U.S. Application Data

(63) Continuation-in-part of application No. 10/071,554, filed on Feb. 8, 2002, now Pat. No. 6,694,884, which is a continuation-in-part of application No. 09/489,591, filed on Jan. 21, 2000, and a continuation-in-part of application No. 09/967,501, filed on Sep. 28, 2001.

(60) Provisional application No. 60/117,123, filed on Jan. 25, 1999.

(51) Int. Cl.[7] ................................................ B41J 11/26
(52) U.S. Cl. ........................... 400/621; 705/22; 705/28
(58) Field of Search .................... 101/232, 237–238, 101/240, 485, 484, 487; 400/602, 487, 624, 634–635, 621, 521, 642, 208, 207; 221/129, 232, 231, 281, 282, 285, 197; 271/160, 165–166, 10.06, 35, 23, 116; 347/222, 262, 264, 4, 14, 37, 19; 705/50, 56, 57, 22, 28, 29

(56) References Cited

U.S. PATENT DOCUMENTS

| 1,515,986 | A | | 11/1924 | Wright et al. |
| 3,446,415 | A | * | 5/1969 | Bromley ........................ 220/62 |
| 3,584,867 | A | * | 6/1971 | Cargill .......................... 271/97 |
| 3,598,396 | A | | 8/1971 | Andrews et al. ................ 271/9 |
| 3,761,079 | A | * | 9/1973 | Azure ........................... 271/116 |

(Continued)

FOREIGN PATENT DOCUMENTS

| DE | 25 35 699 A1 | 3/1977 |
| EP | 0 115 208 A1 | 8/1984 |
| EP | 0 562 979 | 9/1993 |

(Continued)

OTHER PUBLICATIONS

Search Report for International Application No. PCT/US 03/26654, filed Aug. 25, 2003. Date of mailing: Dec. 30, 2003.

Office Communication with Office Action Summary for U.S. Appl. No. 10/126,427 filed Apr. 19, 2002, dated mailed Nov. 17, 2003.

International Search Report from the European Patent Office for International Application No. PCT/US 03/11413, filed Apr. 15, 2003 dated Oct. 8, 2003.

(Continued)

*Primary Examiner*—Eugene H. Eickholt
(74) *Attorney, Agent, or Firm*—Westman, Champlin & Kelly, P.A.

(57) ABSTRACT

A card cartridge includes a housing having a pair of opposing side walls, a top, a front wall, a back wall opposite the front wall, and a base. The housing includes an interior cavity that is sized to accommodate a stack of cards, a card access, and a card output slot. The card access allows a card transport mechanism to engage a lead card contained in the housing and feed the lead card through the card output slot.

53 Claims, 8 Drawing Sheets

U.S. PATENT DOCUMENTS

| | | | |
|---|---|---|---|
| 3,887,106 A * | 6/1975 | Charlson et al. | 221/197 |
| 3,889,472 A | 6/1975 | Guillaud | 60/698 |
| 3,908,983 A | 9/1975 | Long | 271/35 |
| 3,948,506 A * | 4/1976 | Crimmins et al. | 271/165 |
| 3,960,072 A | 6/1976 | Ahlgren et al. | 101/35 |
| 3,991,998 A | 11/1976 | Banz et al. | 271/125 |
| 4,015,839 A | 4/1977 | McKee | 271/37 |
| 4,017,068 A | 4/1977 | McKee | 271/275 |
| 4,021,032 A * | 5/1977 | Gross et al. | 271/166 |
| 4,031,518 A | 6/1977 | Sweeney et al. | 340/172.5 |
| 4,061,329 A * | 12/1977 | Sachuk et al. | 271/10.09 |
| 4,068,028 A | 1/1978 | Samonides | 428/40 |
| 4,102,267 A | 7/1978 | Ritzerfeld | 101/132.5 |
| 4,146,900 A | 3/1979 | Arnold | 346/75 |
| 4,161,312 A | 7/1979 | Eckhardt et al. | 271/3 |
| 4,393,386 A | 7/1983 | Di Giulio | 346/75 |
| 4,437,658 A | 3/1984 | Olson | 271/125 |
| 4,534,313 A | 8/1985 | Louvel | 118/696 |
| 4,604,631 A | 8/1986 | Jinnai et al. | 346/1.1 |
| 4,680,596 A | 7/1987 | Logan | 346/140 |
| 4,685,702 A | 8/1987 | Kazuharu | 283/81 |
| 4,686,540 A | 8/1987 | Leslie et al. | 346/33 |
| 4,716,346 A | 12/1987 | Matsuo | 318/38 |
| 4,734,868 A | 3/1988 | DeLacy | 364/519 |
| 4,750,743 A * | 6/1988 | Nicoletti | 273/148 A |
| 4,781,985 A | 11/1988 | Desjarlais | 428/421 |
| 4,789,079 A * | 12/1988 | Kobayashi et al. | 221/232 |
| 4,797,018 A | 1/1989 | Hofmann et al. | 400/249 |
| 4,830,354 A | 5/1989 | Penson | 271/147 |
| 4,845,490 A | 7/1989 | Ward et al. | 340/825.31 |
| 4,961,088 A | 10/1990 | Gilliland et al. | 355/206 |
| 4,961,566 A | 10/1990 | Labombarde, deceased | 271/35 |
| 5,018,614 A * | 5/1991 | Ruckert | 194/236 |
| 5,098,210 A | 3/1992 | Fujisawa et al. | 400/624 |
| 5,111,239 A | 5/1992 | Kamimura et al. | 355/45 |
| 5,138,344 A | 8/1992 | Ujita | 400/175 |
| 5,148,187 A | 9/1992 | Ono et al. | 346/76 |
| 5,149,211 A | 9/1992 | Pettigrew | 400/88 |
| 5,184,181 A | 2/1993 | Kurando et al. | 355/260 |
| 5,239,926 A | 8/1993 | Nubson et al. | 101/487 |
| 5,244,197 A | 9/1993 | Helmstadter | 271/35 |
| 5,266,968 A | 11/1993 | Stephenson | 400/208 |
| 5,267,800 A | 12/1993 | Petteruti et al. | 400/88 |
| 5,277,501 A | 1/1994 | Tanaka et al. | 400/120 |
| 5,295,675 A | 3/1994 | Hain | 271/12 |
| 5,296,874 A | 3/1994 | Nagata et al. | 346/76 |
| 5,301,834 A * | 4/1994 | Lee et al. | 221/129 |
| 5,318,370 A | 6/1994 | Nehowig | 400/207 |
| 5,327,201 A | 7/1994 | Coleman et al. | 355/278 |
| 5,368,677 A | 11/1994 | Ueda et al. | 156/362 |
| 5,455,617 A | 10/1995 | Stephenson et al. | 400/207 |
| 5,466,319 A | 11/1995 | Zager et al. | 156/220 |
| 5,494,364 A | 2/1996 | Murakami et al. | 400/599.1 |
| 5,502,464 A | 3/1996 | Takahashi et al. | 346/25 |
| 5,516,218 A | 5/1996 | Amano et al. | 400/535 |
| 5,545,882 A | 8/1996 | Tanaka | 235/98 |
| 5,630,581 A * | 5/1997 | Rodesch | 271/23 |
| 5,642,877 A | 7/1997 | Green | 271/35 |
| 5,646,388 A | 7/1997 | D'Entremont et al. | 235/380 |
| 5,695,589 A | 12/1997 | German et al. | 156/250 |
| 5,703,347 A | 12/1997 | Reddersen et al. | 235/472 |
| 5,707,162 A | 1/1998 | Kasai et al. | 400/692 |
| 5,709,484 A | 1/1998 | Dorner | 400/188 |
| 5,755,519 A | 5/1998 | Klinefelter | 400/249 |
| 5,762,431 A * | 6/1998 | Pawelka et al. | 400/642 |
| 5,829,631 A * | 11/1998 | Kasper | 221/198 |
| 5,837,991 A | 11/1998 | LaManna et al. | 235/475 |
| 5,889,866 A | 3/1999 | Cyras et al. | 380/49 |
| 5,936,008 A | 8/1999 | Jones et al. | 523/161 |
| 5,941,414 A * | 8/1999 | Kasper | 221/210 |
| 5,959,278 A * | 9/1999 | Kobayashi et al. | 235/449 |
| 5,980,011 A | 11/1999 | Cummins et al. | 347/4 |
| 5,995,774 A | 11/1999 | Applegate et al. | 399/27 |
| 6,011,741 A | 1/2000 | Wallace et al. | 365/221 |
| 6,037,879 A | 3/2000 | Tuttle | 340/825.54 |
| 6,039,430 A | 3/2000 | Helterline et al. | 347/19 |
| 6,062,558 A | 5/2000 | Takahashi | 271/123 |
| 6,071,024 A | 6/2000 | Chi-Ming et al. | 347/177 |
| 6,072,402 A | 6/2000 | Kniffin et al. | 340/825 |
| 6,099,101 A | 8/2000 | Maurelli et al. | 347/7 |
| 6,099,178 A | 8/2000 | Spurr et al. | 400/207 |
| 6,102,388 A | 8/2000 | Thornhill | 271/119 |
| 6,113,208 A | 9/2000 | Benjamin et al. | 347/7 |
| 6,163,658 A | 12/2000 | Suzuki | 399/12 |
| 6,213,392 B1 | 4/2001 | Zuppicich | 235/380 |
| 6,249,303 B1 * | 6/2001 | Mochizuki et al. | 347/222 |
| 6,252,791 B1 | 6/2001 | Wallace et al. | 365/221 |
| 6,263,170 B1 | 7/2001 | Bortnem | 399/13 |
| 6,264,296 B1 | 7/2001 | Klinefelter et al. | 347/4 |
| 6,264,301 B1 | 7/2001 | Helterline et al. | 347/19 |
| 6,267,370 B1 | 7/2001 | Ito et al. | 271/138 |
| 6,267,463 B1 | 7/2001 | Paulsen | 347/19 |
| 6,271,928 B1 | 8/2001 | Bullock et al. | 358/1.16 |
| 6,302,527 B1 | 10/2001 | Walker | 347/50 |
| 6,305,795 B2 | 10/2001 | Childers et al. | 347/86 |
| 6,312,083 B1 | 11/2001 | Moore | 347/19 |
| 6,312,106 B1 | 11/2001 | Walker | 347/50 |
| 6,315,283 B1 | 11/2001 | Haas et al. | 271/124 |
| 6,318,918 B1 | 11/2001 | Sasaki et al. | 400/624 |
| 6,325,495 B1 | 12/2001 | Foth | 347/84 |
| 6,371,586 B1 | 4/2002 | Saruta | 347/7 |
| 6,402,135 B1 | 6/2002 | Werner | 271/35 |
| 6,412,770 B1 | 7/2002 | Demmeler | 271/94 |
| 6,431,537 B1 | 8/2002 | Meier | 271/9.01 |
| 6,485,012 B1 | 11/2002 | Bakoledis | 271/35 |
| 6,554,512 B2 | 4/2003 | Heno et al. | 400/625 |
| 6,640,717 B2 * | 11/2003 | Kosaka et al. | 101/487 |
| 6,647,871 B2 * | 11/2003 | Morand | 101/33 |
| 6,663,100 B2 * | 12/2003 | Crowley | 271/165 |
| 6,694,884 B2 * | 2/2004 | Klinefelter et al. | 101/484 |
| 6,758,616 B2 * | 7/2004 | Pribula et al. | 400/624 |
| 6,816,968 B1 | 11/2004 | Walmsley | 713/168 |
| 2002/0158399 A1 * | 10/2002 | Heno et al. | 271/3.14 |
| 2002/0171728 A1 | 11/2002 | Pribula et al. | 347/104 |
| 2003/0024422 A1 | 2/2003 | Pribula et al. | 101/35 |

FOREIGN PATENT DOCUMENTS

| | | |
|---|---|---|
| EP | 0 887 197 | 12/1998 |
| EP | 0 979 736 | 2/2000 |
| FR | 1 068 162 A | 6/1954 |
| GB | 1 237 145 A | 6/1971 |
| GB | 2 120 821 A | 12/1983 |
| GB | 2 258 459 | 2/1993 |
| GB | 2 258 459 A | 2/1993 |
| JP | 55-80630 | 6/1980 |
| JP | 07 101580 | 4/1995 |
| JP | 11-240638 | 9/1999 |
| JP | 11 265463 | 9/1999 |
| WO | WO 95/09084 | 4/1995 |
| WO | WO 99/04368 | 1/1999 |
| WO | WO 99/21713 | 5/1999 |
| WO | 99/49379 | 9/1999 |
| WO | WO 00/43932 | 7/2000 |
| WO | WO 01/92019 A2 | 12/2001 |
| WO | WO 03/089348 A1 | 10/2003 |

OTHER PUBLICATIONS

International Search Report from International Application No. PCT/US 03/06187, filed Feb. 28, 2003. Search report dated Jul. 18, 2003.

"Standard Read/Write Identification IC", by TEMIC Semiconductor GmbH, Heilbronn, Germany, (Apr. 1999).

"Introducing the New SmartGuard™ and SmartShield™ Advanced Security Options", pamphlet by Fargo Electronics, Inc., Eden Prairie, Minnesota (1998).

"RFID Tagging IC is First to Accept Input from Sensors", by Microchip Technology Inc., (undated).

Two page web site advertisement from SEIKO Precision, entitled "The lastest design for your CD–R", re: CD Printer 2000.

Two page web site advertisement from SEIKO Precision, entitled "CD Printer 2000".

Two page web site advertisement from SEIKO Precision, entitled "CD Printer 4000".

Partial International Search for International Application No. PCT/US 01/17146, filed May 25, 2001 (with Invitation to Pay Fees).

International Search Report for International Application No. PCT/US 00/01697, filing date Jan. 21, 2000, dated Oct. 18, 2000.

International Search Report of International Application No. PCT/US 03/1140, filed Apr. 15, 2003, dated Aug. 6, 2003.

Office Communication for U.S. Appl. No. 10/235,340, filed Sep. 5, 2002, mailing date Oct. 21, 2004.

* cited by examiner

CARD CARTRIDGE

CROSS REFERENCE TO RELATED APPLICATIONS

The present invention is a Continuation-in-Part of U.S. patent application Ser. No. 10/071,554 entitled "METHOD AND APPARATUS FOR COMMUNICATING BETWEEN PRINTER AND CARD SUPPLY," for inventors Gary M. Klinefelter, Jeffrey D. Upin, Gary A. Lenz, Martin A. Pribula and James R. Meier filed Feb. 8, 2002 now U.S. Pat. No. 6,694,884, which is a Continuation-in-Part of U.S. application Ser. No. 09/489,591, Filed Jan. 21, 2000, and entitled "METHOD AND APPARATUS FOR COMMUNICATING BETWEEN PRINTER OR LAMINATOR AND SUPPLIES," which in turn claims priority to U.S. Provisional Application Ser. No. 60/117,123, which was filed Jan. 25, 1999; and U.S. patent application Ser. No. 09/967,501, entitled "CARD HOPPER," filed Sep. 28, 2001. Additionally, reference is hereby made to the following related co-pending applications filed on even date herewith: application Ser. No. 10/126,428, entitled "IDENTIFICATION CARD PRINTER HAVING MULTIPLE CONTROLLERS," for inventors Gary W. Klinefelter, Leonid S. Gershenovich, Gary A. Lenz, and Robert E. Francis; application Ser. No. 10/126,427, entitled "IDENTIFICATION CARD PRINTER," for inventors Martin A. Pribula, James R. Mejer, Stacy W. Lukaskawcez, Gary M. Klinefelter, Leonid S. Gershenovich, Gary A. Lenz, and Jeffrey D. Upin; application Ser. No. 10/127,024, entitled "CARD TRANSPORT MECHANISM ROLLER SUPPORT," for inventors Martin A. Pribula and Gary M. Klinefelter; application Ser. No. 10/126,439, entitled "CARD CARTRIDGE AND CARD FEEDER ADAPTER FOR AN INK JET SHEET FEEDER PRINTER," for inventors Gary M. Klinefelter, Martin A. Pribula, Leonid S. Gershenovich and Stacy W. Lukaskawcez; and application Ser. No. 10/126,440, entitled "IDENTIFICATION CARD PRINTER DATA ENCODER MODULE," for inventors Darrell T. Olson and Matthew K. Dunham. All of the above-referenced applications are incorporated herein by reference in their entirety.

FIELD OF THE INVENTION

The present invention relates to identification card printers used to print images on a surface of rigid or semi-rigid planar substrates. More particularly, the present invention relates to a card cartridge for use with an identification card printer.

BACKGROUND OF THE INVENTION

Identification card printers along with the aid of a computer are typically used to form identification cards by printing an image on a card substrate. The image generally includes a photograph and other information relating to the card holder, such as the card holder's name, employee number, and other information. Such identification cards are used for many purposes, such as driver's licenses, identification badges, etc. The image that is to be printed on the card by the identification card printer is generally formed by combining textual and graphical portions received from host applications running on the computer or from other input devices such as keyboards, scanners, and digital cameras. Data relating to the formatted image is then provided to the printer in the form of a print job. The printer processes the print job by printing the image onto a surface of the card.

Typical identification card printers include a print mechanism, a transport mechanism, and a card holder. For thermal-based identification card printers, the print mechanism can include a thermal print ribbon having primary color dye panels and a thermal printhead. The thermal printhead heats the ribbon and causes dye on the color panels to be released and sublimate into a surface of a card. Alternatively, the identification card printer can be an ink jet printer that includes an ink jet printhead having a supply of ink. The transport mechanism is generally configured to transport cards from the card holder to the print mechanism for printing.

Typical card holders of identification card printers are non-disposable components that are configured to support a stack of cards for feeding to the transport mechanism of the printer. These card holders do not enclose the stack of cards, but instead are open to allow for easy loading and unloading of cards. Unfortunately, these open card holders do not protect the cards from the environment. As a result, dust and other particles can contaminate surfaces of the cards which can adversely affect the print quality and cause other printing problems. Additionally, typical card holders of the prior art fail to support the cards in a flat plane, which can cause the cards to become warped resulting in misfeeds and poor printing.

There is a continuing need for improvements to identification card printers that provide increased reliability and performance. For example, it would be desirable to develop improved card holders that protect the cards enclosed therein from environmental contaminates while maintaining the cards in a substantially flat plane. Additionally, it would be desirable to provide improved card transport reliability by establishing a card transport plane, in which cards are fed from the card holder, that is independent of the card holder.

SUMMARY OF THE INVENTION

The present invention is directed to a card cartridge for use with an identification card printer that protects a stack of cards stored therein from environmental contamination while supporting them in a substantially flat plane to prevent the cards from warping. The card cartridge includes a housing having a pair of opposing side walls, a top, a front wall, a back wall opposite the front wall, and a base. The housing includes an interior cavity that is sized to accommodate a stack of cards. The housing also includes a card access and a card output slot. The card access allows a card transport mechanism to engage a lead card contained in the housing and feed the lead card through the card output slot.

Other features and benefits that characterize embodiments of the present invention will be apparent upon reading the following detailed description and review of the associated drawings.

DETAILED DESCRIPTION OF THE PREFERRED EMBODIMENTS

Figure 1:
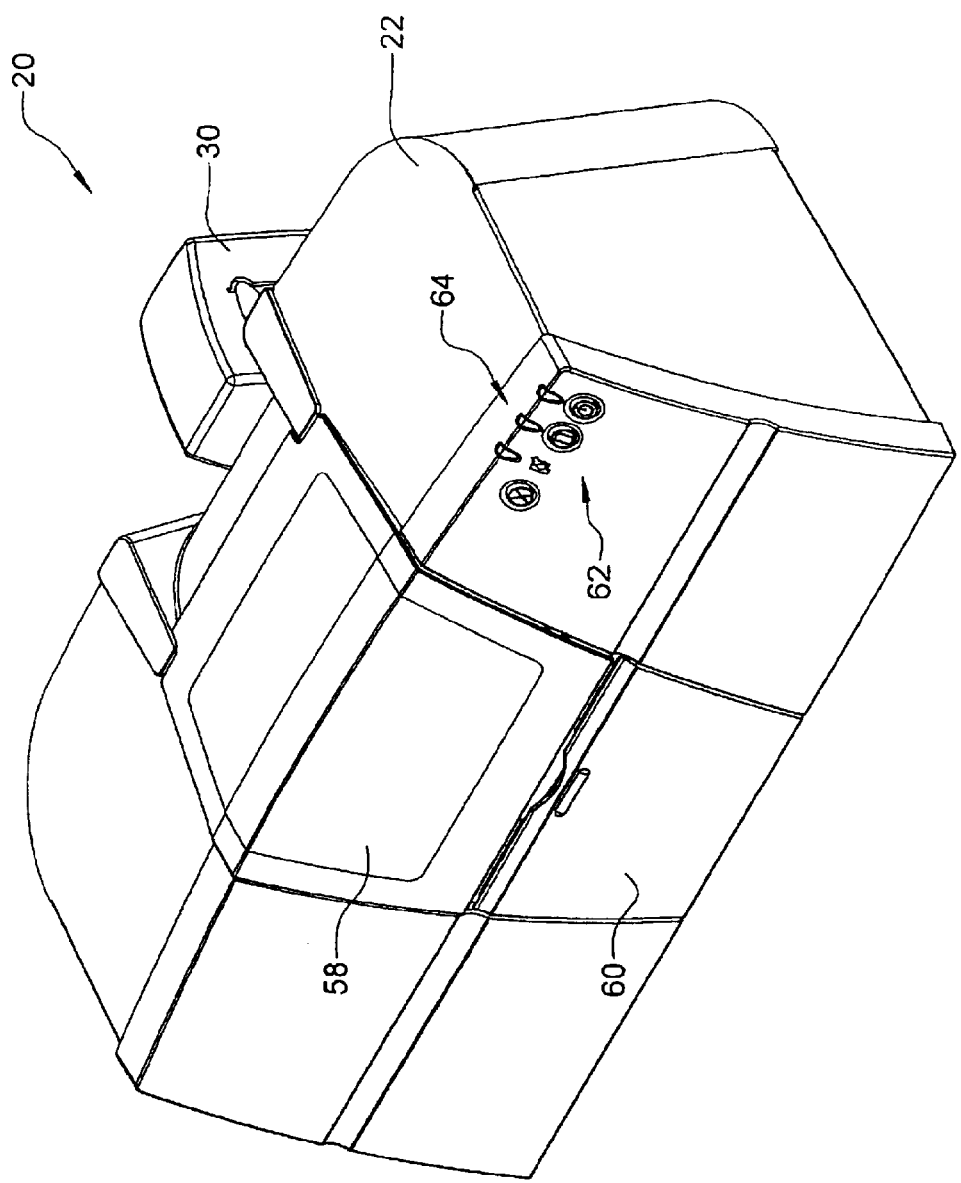
FIGS. 1 and 2 are perspective views of examples of an identification card printer respectively with and without a cover.
Figure 2:
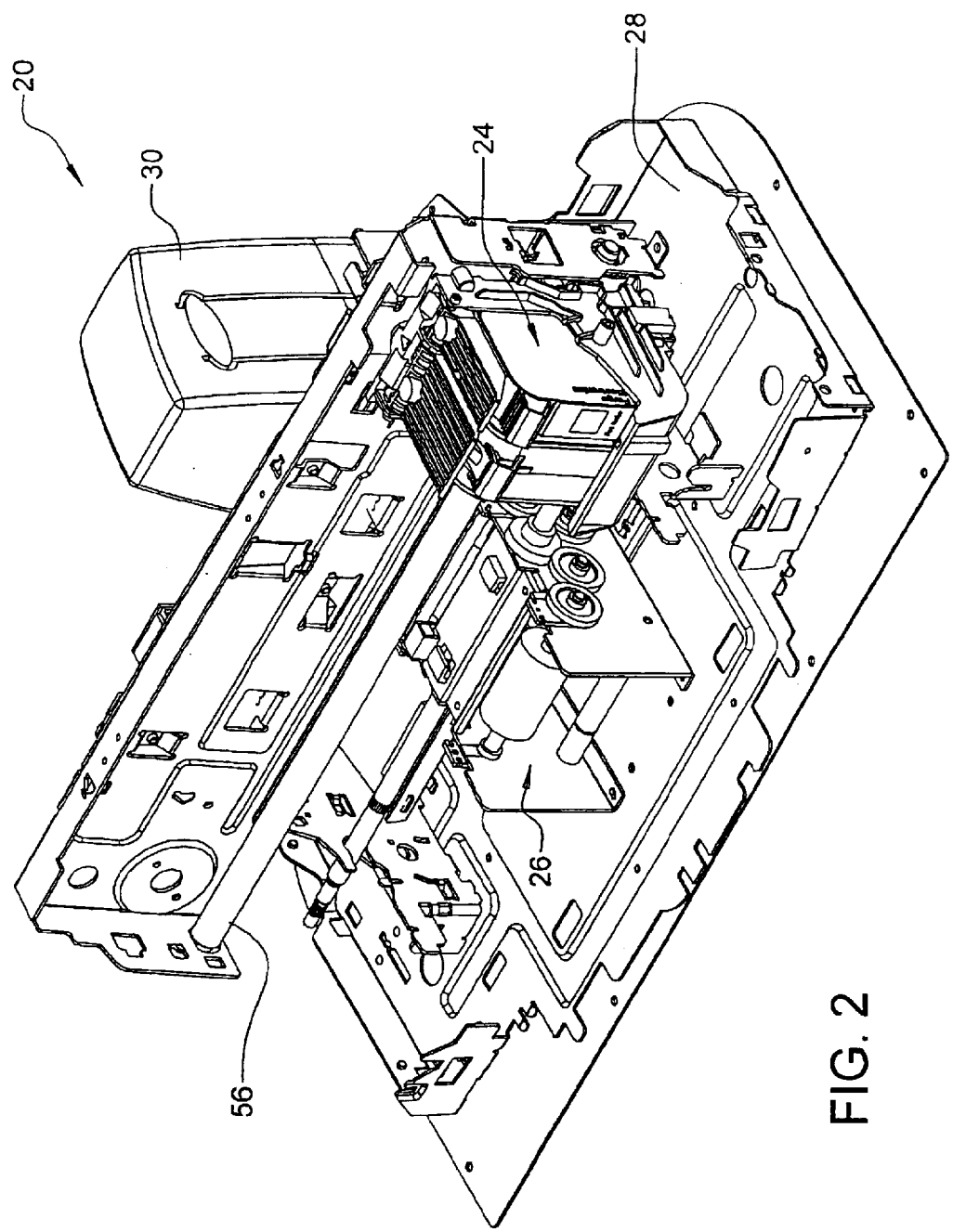

FIGS. 1 and 2 are perspective views of an example of an identification card printer 20 respectively with and without a cover 22, with which embodiments of the present invention can be used. Printer 20 generally includes a print mechanism 24, a transport mechanism 26, a base 28, and printer electronics (not shown) that control the operation of the components of printer 20. Printer 20 can receive cards for processing from card cartridge 30 of the present invention, embodiments of which will be discussed in greater detail below.

Figure 3:
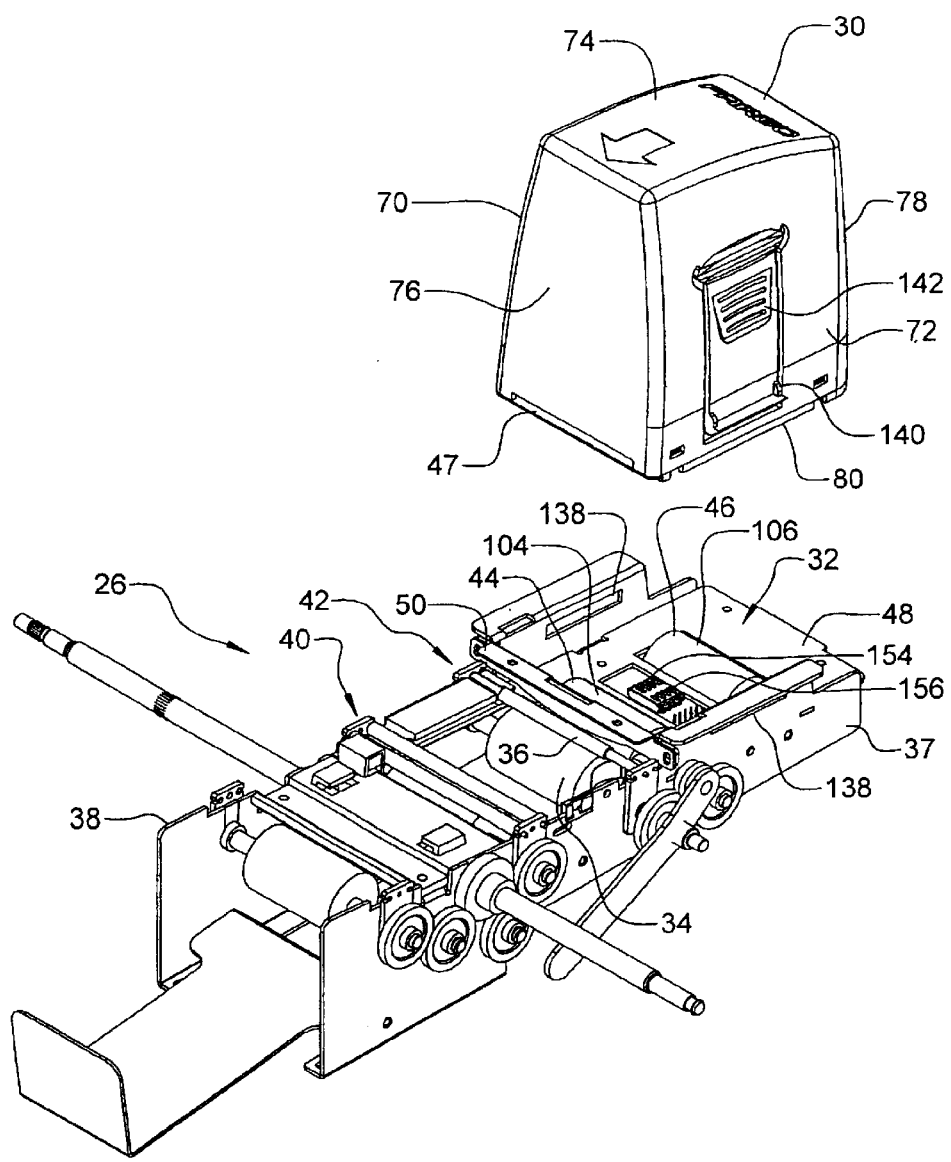
FIG. 3 is a perspective view of an example of a transport mechanism with a card cartridge in accordance with embodiments of the invention, lifted off a cartridge receiver.

Transport mechanism 26 is adapted to deliver cards from card cartridge 30 along a print path to print mechanism 24 for printing. FIG. 3 shows a perspective view of transport mechanism 26 with card cartridge 30 lifted off a cartridge receiver 32, to which it is mounted for operation with identification card printer 20. Transport mechanism 26 includes a plurality of feed rollers 34 and guide rollers 36, some of which are driven by a motor (not shown). The feed and guide rollers 34 and 36 are mounted to side walls 37 and 38, which are mounted to base 28 of printer 20. The feed and guide rollers 34 and 36 form pinch roller assemblies 40 and 42, which have either one or two guide rollers 36 mounted above a feed roller 34. Feed rollers 44 and 46 are positioned adjacent cartridge receiver 32 and are used to feed a lead card contained in cartridge 30 out of output slot 47 of cartridge 30 for delivery to print mechanism 24.

Cartridge receiver 32 is adapted to receive cartridge 30 and generally includes a support member, such as deck 48 on which card cartridge 30 can be seated. Portions of feed rollers 44 and 46 extend above deck 48 and through a card access of card cartridge 30 to engage the lead card. Cartridge receiver 32 can also include guide members that assist in the proper installation of cartridge 30. For example, side walls 37 and 38 and front wall 50 can operate as guide members by engaging cartridge 30 as it is seated on cartridge receiver 32. Front wall 50 can also operate as a card singulation component that operates to prevent multiple card feeds from cartridge 30. A cover (not shown) for cartridge receiver 32 can provide additional back and side guide members for further installation assistance.

Print mechanism 24 is depicted as an ink jet printhead having color and black ink jet cartridges 52 and 54, as shown in FIG. 2. Print mechanism 24 can also be a thermal printhead in combination with a thermal print ribbon, or other suitable print mechanism. Print mechanism 24 can also include a positioning mechanism for moving printhead 24 back and forth along rail 56 in a direction that is generally transverse to the card path along which transport mechanism 26 delivers the cards past print mechanism 24. Print mechanism 24 prints image lines on the cards to form the desired image as the card is moved along the print path by transport mechanism 26. Once the printing is complete, the printed card can be discharged into a card hopper or other card processing device by transport mechanism 26.

Cover 22 of printer 20 includes front doors 58 and 60. Door 58 provides access to the components of printer 20 including print mechanism 24. Door 60 generally provides access to processed cards. Buttons 62 on cover 22 provide user input to printer 20 and turn printer 20 on and off. Printer 20 can also include lights 64 or a display on cover 22 to provide information to a user.

Figure 4:
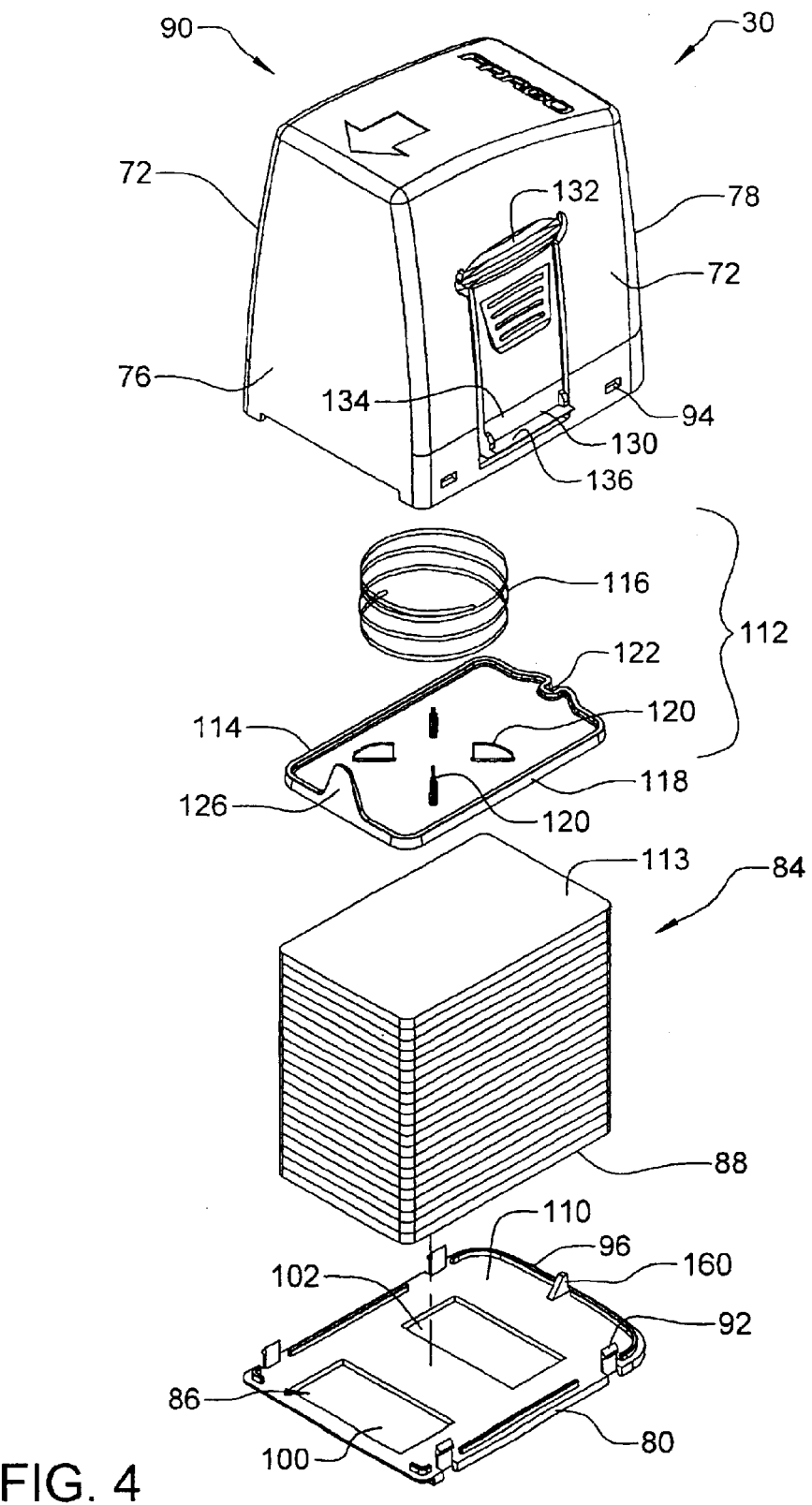
FIG. 4 is an exploded perspective view of a card cartridge in accordance with embodiments of the invention.
Figure 5:
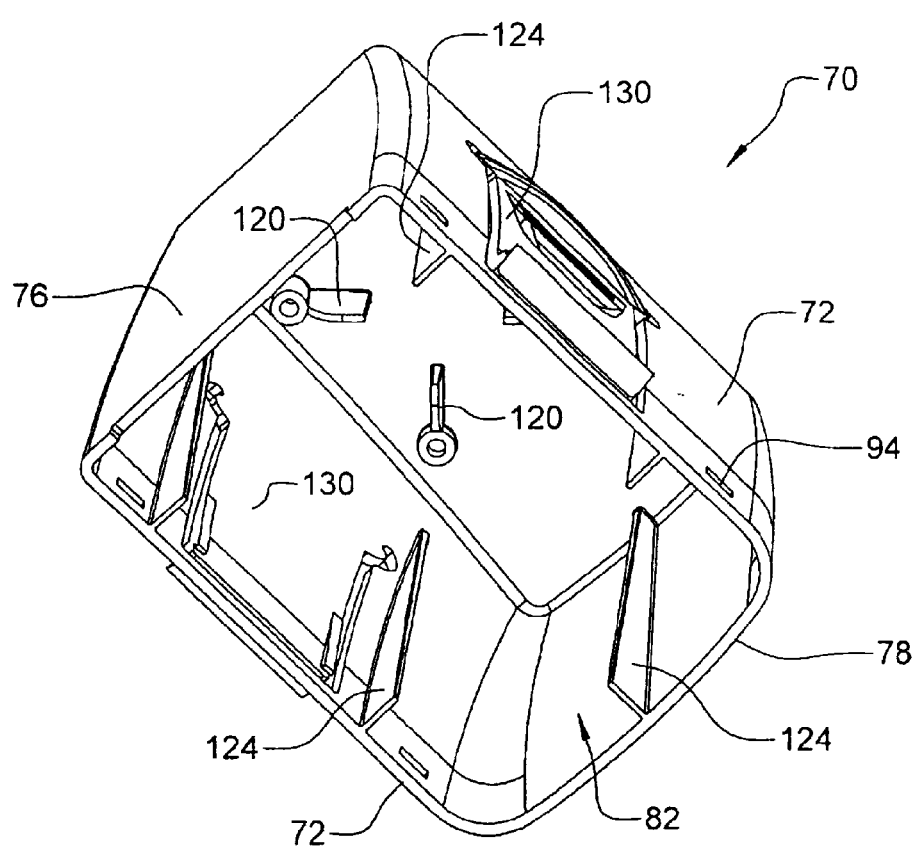
FIG. 5 is a bottom perspective view of a housing of a card cartridge in accordance with embodiments of the invention.

FIG. 4 is an exploded perspective view of card cartridge 30 in accordance with various embodiments of the invention. Card cartridge 30 generally comprises a housing 70 (FIG. 3) that includes a pair of opposing side walls 72, a top 74, a front wall 76, a back wall 78 opposite the front wall 76, and a base 80. The card output slot 47 (FIG. 3) is formed between front wall 76 and base 80. Housing 70 includes an interior cavity 82 that is sized to accommodate a stack of cards 84, as shown in FIG. 5. Housing 70 also includes a card access 86 through which transport mechanism 26 can engage a lead card 88 of card stack 84. Housing 70 is preferably formed in two pieces: base 80 and a cover 90 that includes side walls 72, front wall 76, back wall 78 and top 74. Portions of housing 70, such as cover member 90, can be formed from opaque or transparent plastic to allow a user to visually assess the number of cards that remain in card cartridge 30.

In accordance with one embodiment, base 80 includes connecting members 92 that are used to attach base 80 to cover member 90. Connecting members 92 can include latching components that cooperate with slots 94 of cover member 90 to attach base 80 to cover member 90. Base 80 can also include guide members 96 to assist in the alignment of base 80 with cover member 90 during assembly. The guide members 96 can include guide walls that extend around the perimeter of base 80 and reinforce the walls of cover member 90 against compressive forces.

Figure 6:
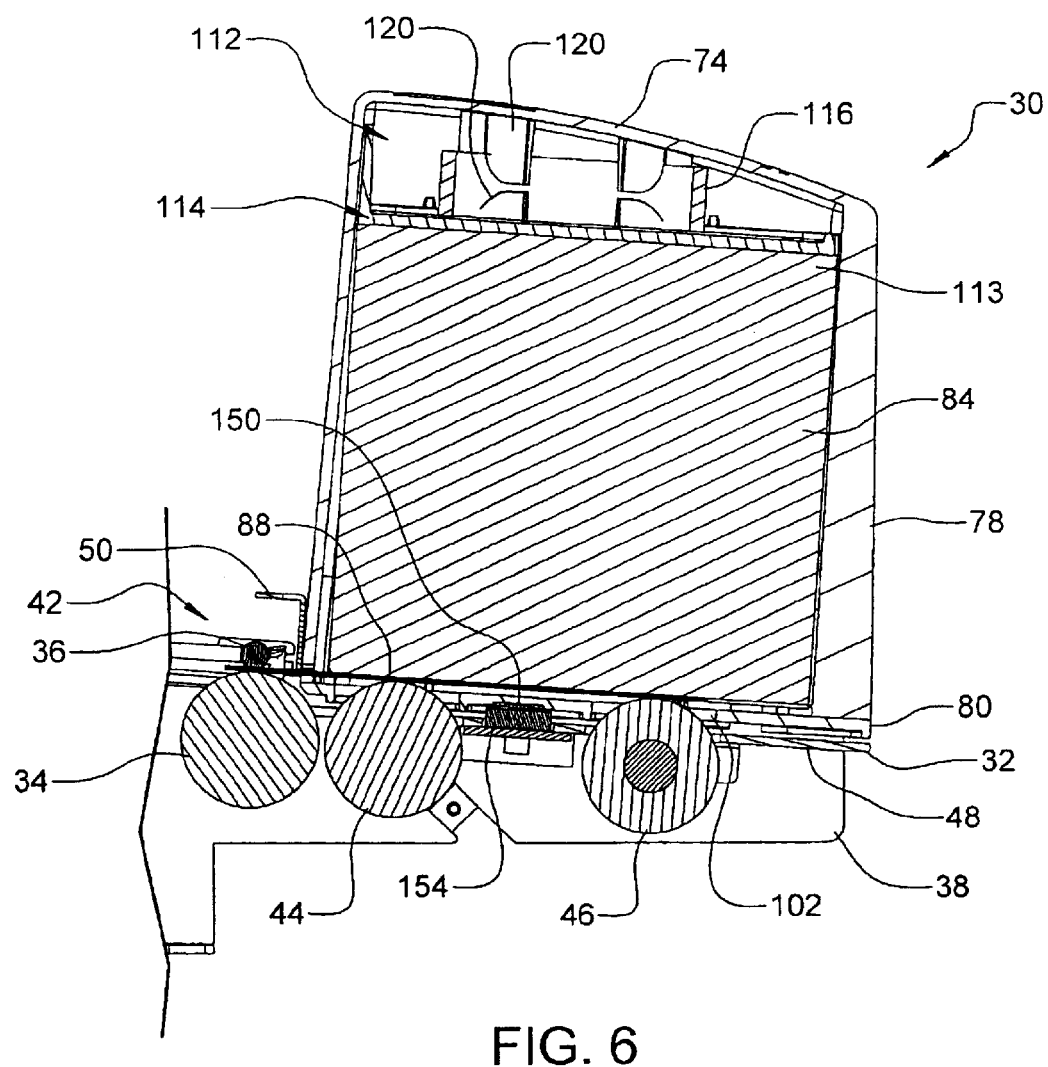
FIG. 6 is a side cross-sectional view of a card cartridge mounted to a cartridge receiver illustrating engagement of a lead card by transport mechanism components.

Card access 86 includes at least one aperture through which transport mechanism 26 can engage lead card 88 of card stack 84. In accordance with one embodiment, card access 86 is formed in base 80 by first and second apertures 100 and 102. First aperture 100 is positioned adjacent front wall 76 and second aperture 102 is positioned adjacent back wall 78 of housing 70. The first and second apertures 100 and 102 are sized to allow top portions 104 and 106 of feed rollers 44 and 46 of transport mechanism 26 to engage lead card 88 when card cartridge 30 is installed on cartridge receiver 32, as shown in FIG. 6, which is a side cross-sectional view of card cartridge 30 mounted to cartridge receiver 32. This causes lead card 88 and card stack 84 to be raised slightly above the inside surface 110 of base 80. This configuration allows the feed rollers 44 and 46 of transport mechanism 26 to establish a card transport plane aligned with lead card 88 that is formed independently of the card cartridge 30. As a result, other components of printer 20, such as a card singulation component 50, can easily be positioned with reference to the card transport plane. Additionally, this configuration prevents the warping of the cards 84 by providing a flat support when the cartridge 30 is installed on cartridge receiver 32.

Figure 7:
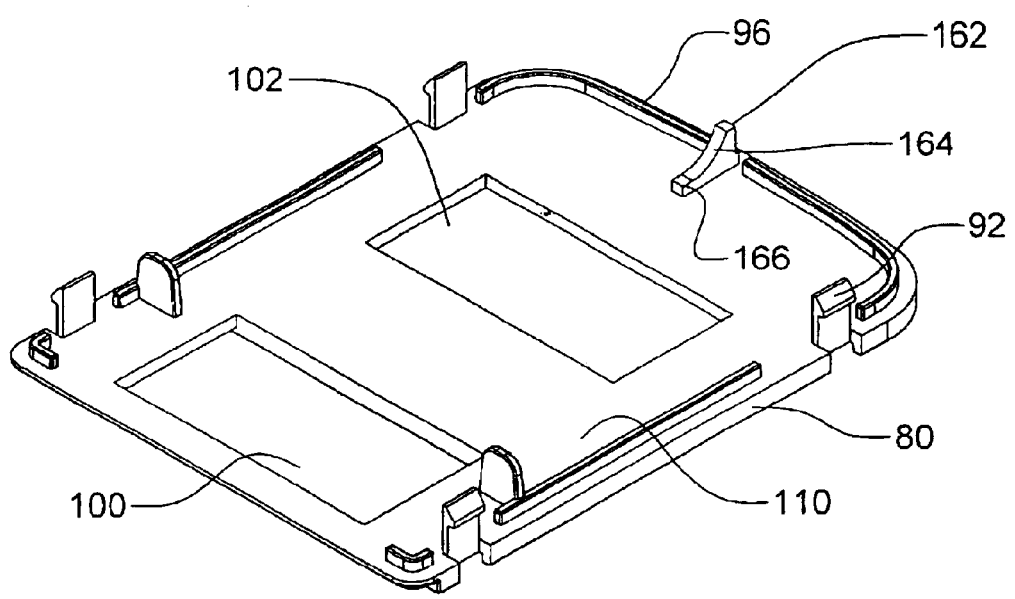
FIG. 7 is a perspective view of a base of a card cartridge in accordance with an embodiment of the invention.

In accordance with another embodiment of the invention, a card separating member is provided, which operates to encourage separation of lead card 88 from the card stack 84 to improve card feeding operations and reduce misfeeds. The card separating member preferably improves card feeding reliability by reducing frictional resistance between lead card 88 and the card positioned immediately there-above as lead card 88 is fed through output slot 47. In accordance with one embodiment of the invention, the card separating member is a ramp 160 formed as a component of base 80 and positioned adjacent a trailing edge of the card stack 84 and back wall 78, as shown in FIG. 4. Ramp 160 operates to splay the lower group of cards in card stack 84 and promotes separation of lead card 88 during card feeding operations. In accordance with another embodiment, the separating member is formed on base 80 as a curved step member 162, as shown in FIG. 7. A curved portion 164 operates to splay the lower group of cards in stack 84 and a step portion 166 provides support to card stack 84 as lead card 88 is fed through card output slot 47. This reduces frictional forces on lead card 88 and improves card feeding performance. Alternatively, the separating member could be formed as a component of cartridge receiver 32 with a corresponding opening formed in base 80 through which the separating component can engage card stack 84.

In accordance with another embodiment of the invention, card cartridge 30 includes a biasing mechanism 112, shown in FIGS. 4 and 6, that operates to apply a force to an end card 113 of card stack 84 to thereby direct the card stack 84 toward base 80. When card cartridge 30 is not mounted to cartridge receiver 32, biasing mechanism 112 forces lead card 88 against surface 110 (FIG. 4) of base 80, which provides a flat support to prevent the cards 84 from warping. The force applied by the biasing mechanism 112, maintains the card stack 84 against base 80 even when card cartridge 30 is jostled or rotated on a side. When card cartridge 30 is mounted to cartridge receiver 32, biasing mechanism 112 forces the card stack 84 against the transport mechanism components extending through the card access 86, such as feed rollers 44 and 46, which establish the flat card transport plane and are used to feed lead card 88 through output slot 47.

In accordance with one embodiment, biasing mechanism 112 includes a card plate 114 and a coil spring 116. Spring 116 is compressed between card plate 114 and top 74 of housing 70 to apply the desired force against card plate 114. Card plate 114 includes a flat bottom 118 that engages end card 113 of card stack 84 to apply the force thereto. Tabs 120 mounted to card plate 114 and top 74 of housing 70 can be used to attach and/or align spring 116 with card plate 114. Card plate 114 can include a notch 122 that receives a guide fin 124 on back wall 78 (FIG. 5) and a guide member 126 that engages front wall 76 to maintain the desired orientation of plate 114 as it moves within housing 70. The interior walls of housing 70 can include additional guide fins 124 to restrict the movement of a card stack 84 that is enclosed therein and guide the movement of plate 114. The force applied to card stack 84 by biasing mechanism 112 will vary depending upon the number of cards in the stack, but is preferably less than 3.0 lbs. and greater than 0.2 lbs.

Figure 8:
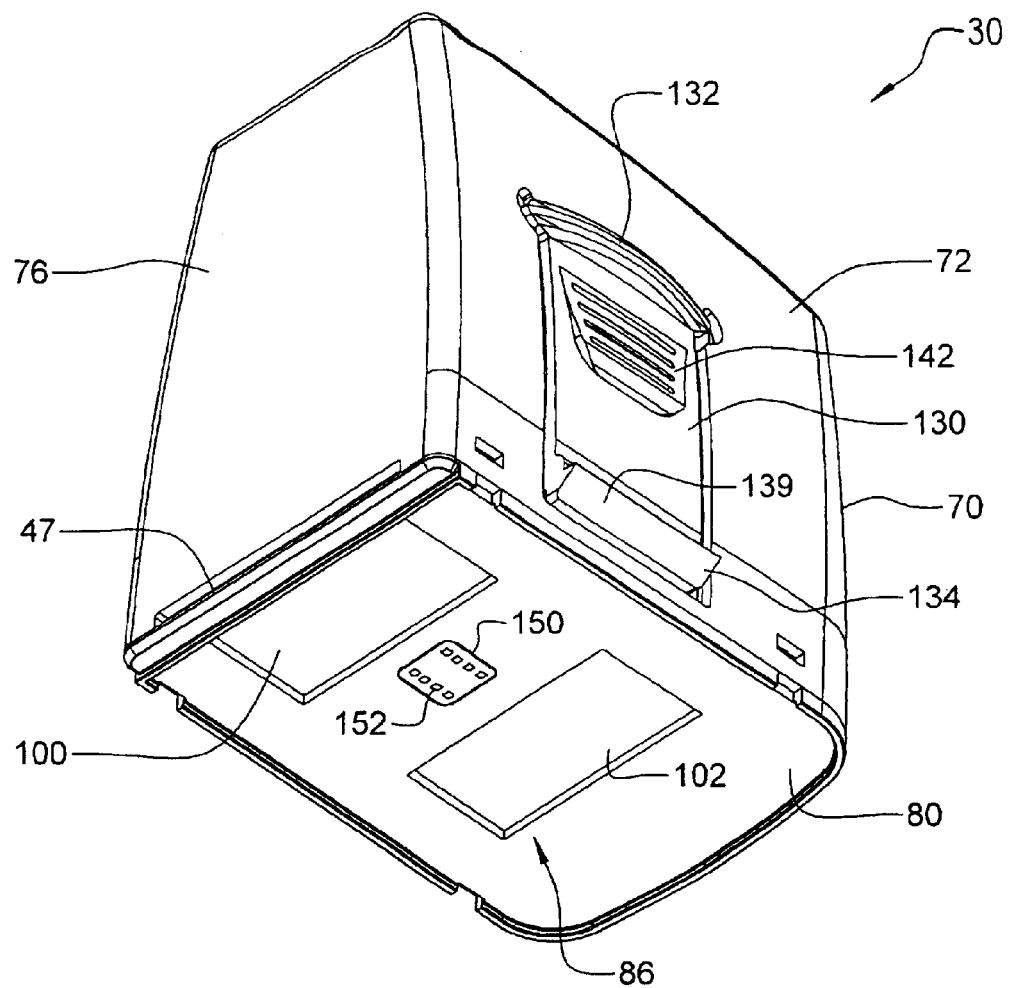
FIG. 8 is a bottom perspective view of a card cartridge in accordance with embodiments of the invention.

Housing 70 also includes a connector for mounting card cartridge 30 to cartridge receiver 32 of identification card printer 20. In accordance with one embodiment, the connector includes a pair of tab members 130 attached to side walls 72 of housing 70 at a proximal end 132, as shown in FIGS. 4 and 8. A distal end 134 of the tab members 130 includes a latching component that is adapted to engage a cooperating component of cartridge receiver 32 to facilitate mounting the card cartridge 30 to cartridge receiver 32 when tab members 130 are in a locking position, and disengage the cooperating component of cartridge receiver 32 when tab members 130 are in a release position.

In accordance with one embodiment, the latching component includes a shoulder member 136 and the cooperating component of cartridge receiver 32 is aperture 138, shown in FIG. 3. Shoulder member 136 includes a lower beveled portion 139 that engages side walls 37 and 38 of cartridge receiver 32 and forces tab members 130 to pivot inward about proximal end 132 into the release position as cartridge 30 is seated on cartridge receiver 32. Tab members 130 then spring back to a locking position (relaxed state) such that shoulder members 136 are received by apertures 138 of cartridge receiver 32 to mount card cartridge 30 to cartridge receiver 32. Spacers 140 can abut side walls 37 and 38 of cartridge receiver 32 when card cartridge 30 is seated thereon to slightly displace tab members 130 from their relaxed state and encourage engagement of shoulder member 136 and aperture 138. Card cartridge 30 can be released single-handedly from the cartridge receiver 32 by squeezing tab members 130 at finger pads 142 to thereby move the tab members 132 to the release position. Many other suitable connectors can be used in place of tab members 132 to connect card cartridge 30 to cartridge receiver 32.

Card cartridge 30 is assembled by first installing biasing mechanism 112 in cover member 90 of housing 70. Cover member 90 can then be placed over a stack of cards 84 that are positioned on base 80, and attached to base 80 by connecting members 92. In accordance with a preferred method of assembling card cartridge 30, two to four guide posts are mounted to a platform. Base 80 is then inserted between the guide posts, which abut the perimeter of base 80. Card stack 84 is then positioned on base 80 and cover member 90, with the pre-installed biasing mechanism 112, is then guided by the guide posts into position over the stack of cards for attachment to base 80. Finally, the assembled card cartridge 30 is removed from the guideposts.

In accordance with one embodiment, card cartridge 30 includes a supply circuit 150, as shown in FIG. 8. Supply circuit 150 is preferably an integrated circuit that includes a memory containing supply information relating to various parameters of card cartridge 30. In accordance with one embodiment, supply circuit 150 is mounted to base 80 adjacent card access 86.

The supply information can include, for example, a card supply identifier, a card type, card dimensions (length, width and thickness), card features, card identifiers, card orientation, a card count, card supplier information (i.e. lot number), dealer information, security codes, an expiration date, printer settings, and other information. The card type identifies a pre-defined type of card such as a CR-80, CR-90 or other standardized type of card. The card features can include such things as whether the card has a magnetic stripe, is a "smart" card, and other conventional card features. The card supply identifier allows for a check to be performed to determine whether card cartridge 30 or cards 84 stored therein are compatible with identification card printer 20. The card identifiers can be a series of serial numbers that uniquely identify each card stored in card cartridge 30. This information can be used, for example to correlate the printed identification card with the person who printed the card. The card orientation relates to whether the cards 84 are oriented lengthwise or widthwise with the card path along which transport mechanism 26 will feed the cards. The printer settings allow printer 20 to be configured for optimal performance. The card dealer information relates to the dealer that sold the cartridge 30, which may be responsible for customizing the supply information stored in the memory of supply circuit 150. The card count relates to the number of cards in the card stack 84. The card count can initially relate to a number of cards in an unused cartridge 30, which can be updated by the printer electronics or controller by subtracting the number of process cards to maintain a remaining card count.

The security codes can be used to prevent unauthorized use of the cards contained in card cartridge 30 or prevent the use of card cartridge 30 with unauthorized printing systems. An improper security code could, for example, trigger an interlock in printer 20 to prevent the operation thereof. The expiration date can be used as a security measure to prevent the use of cards after a predetermined date.

In accordance with one embodiment of the invention, supply circuit 150 includes electrical contacts 152 for communicating supply information with a controller of printer 20 through a supply circuit interface 154 of cartridge receiver 32 shown in FIG. 3. The supply circuit interface of cartridge receiver 32 can include electrical contacts 156 that correspond to the electrical contacts 152 of supply circuit 150. When card cartridge 30 is installed on cartridge receiver 32, the electrical contacts 152 and 156 of supply circuit 150 and supply interface 154 contact each other and provide a communication link between a controller of printer 20 and supply circuit 150. Alternatively, radio frequency (RF) communication methods can be implemented to provide wireless communication between supply circuit 150 and the controller of identification card printer 20. In addition to communicating supply information between supply circuit 150 and a controller printer 120, the supply circuit 150 and the supply interface 154 can be used to sense when card cartridge 30 is properly installed on cartridge receiver 32. For example, when the electrical contacts 152 of supply circuit 150 properly engage electrical contacts 156 of supply interface 154, the controller of printer 20 can detect that card cartridge 30 is properly installed on cartridge receiver 32.

Although the present invention has been described with reference to preferred embodiments, workers skilled in the art will recognize that changes may be made in form and detail without departing from the spirit and scope of the invention.

What is claimed is:

1. A card cartridge for use with an identification card printer comprising:
   a housing having an interior cavity that is sized to accommodate a stack of cards, the housing including:
   a pair of opposing side walls;
   a top;
   a front wall and a back wall opposite the front wall;
   a card access, through which a card transport mechanism can engage a lead card;
   a card output slot; and
   a connector attached to the housing for mounting the cartridge to a cartridge receiver of the identification card printer, wherein the connector includes a pair of tab members attached to the side walls of the housing at a proximal end, a distal end of the tab members including a latching component adapted to engage a cooperating component of the cartridge receiver to facilitate mounting the card cartridge to the cartridge receiver when the tab members are in a locking position and disengage the cooperating component of the cartridge receiver when in a release position.

2. The card cartridge of claim 1, wherein at least a portion of the housing is formed of transparent or opaque plastic.

3. The card cartridge of claim 1, wherein the housing includes an aperture which forms the card access.

4. The card cartridge of claim 3, wherein the base of the housing includes the card access.

5. The card cartridge of claim 1, wherein the housing includes first and second apertures, which form the card access.

6. The card cartridge of claim 1, wherein the base of the housing includes the card access.

7. The card cartridge of claim 1, wherein the base of the housing includes connecting members for attaching the base to the front, back and side walls of the housing.

8. The card cartridge of claim 1, including a biasing mechanism adapted to apply a force to an end card opposite the lead card of an enclosed stack of cards thereby directing the lead card toward the housing adjacent the output slot.

9. The card cartridge of claim 8, wherein the biasing mechanism directs the stack of cards toward the base of the housing.

10. The card cartridge of claim 8, wherein the biasing mechanism includes:
    a card plate that engages the end card; and
    a spring compressed between the housing and the card plate.

11. The card cartridge of claim 8, wherein the force is less than 3.0 lbs.

12. The card cartridge of claim 1, including a supply circuit mounted to the housing, the supply circuit having a memory containing supply information relating to parameters of the card cartridge.

13. The card cartridge of claim 12, wherein the supply circuit includes electrical contacts through which the supply information can be accessed.

14. The card cartridge of claim 12, wherein the supply circuit is mounted to the base of the housing.

15. The card cartridge of claim 14, wherein the card access is formed in the base of the housing adjacent the supply circuit.

16. The card cartridge of claim 15, wherein the card access includes first and second apertures respectively positioned adjacent the front and back walls of the housing.

17. The card cartridge of claim 1, including a stack of cards enclosed in the housing.

18. The card cartridge of claim 1, wherein the housing includes a removable cover, whereby the cavity can be accessed for loading and unloading of cards.

19. The card cartridge of claim 1, wherein the tab members are biased toward the locking position.

20. The card cartridge of claim 1, wherein the latching component includes a shoulder member.

21. The card cartridge of claim 1, wherein the tab members include finger pads.

22. The card cartridge of claim 1, wherein the base includes a card separating member adjacent back wall, whereby card feed operations are improved.

23. The card cartridge of claim 1, wherein the card separating member is a ramp or a curved step member.

24. An identification card printer comprising:
    the card cartridge of claim 1, containing a stack of cards;
    a cartridge receiver adapted to receive the card cartridge;
    a transport mechanism adjacent the cartridge receiver and adapted to feed cards through the output slot and transport cards along a print path; and
    a print mechanism positioned adjacent the print path for printing on the cards.

25. The printer of claim 1, including a connector attached to the housing for mounting the cartridge to the cartridge receiver.

26. A card cartridge for use with an identification card printer comprising:
    a housing having an interior cavity that is sized to accommodate a stack of cards, the housing including a pair of opposing side walls, a top, a front wall, a back wall opposite the front wall, a base, a card access, through which a card transport mechanism can engage a lead card of an enclosed stack of cards, and a card output slot;
    a biasing mechanism adapted to apply a force to an end card of the stack of cards and direct the lead card toward the base; and
    a supply circuit mounted to the housing, the supply circuit having a memory containing supply information relating to parameters of the card cartridge.

27. The card cartridge of claim 1, including a connector for mounting the card cartridge to a cartridge receiver of an identification card printer.

28. The card cartridge of claim 1, wherein at least a portion of the housing is formed of transparent or opaque plastic.

29. The card cartridge of claim 1, wherein the biasing mechanism includes:
   a card plate that engages the end card; and
   a spring compressed between the housing and the card plate.

30. The card cartridge of claim 26, wherein the supply circuit includes electrical contacts through which the supply information can be accessed.

31. The card cartridge of claim 26, wherein the supply circuit is mounted to the base of the housing.

32. The card cartridge of claim 26, wherein the housing includes a removable cover for loading and unloading cards.

33. The card cartridge of claim 27, wherein the connector includes a pair of tab members attached to the side walls of the housing at a proximal end, a distal end of the tab members including a latching component adapted to engage a cooperating component of the cartridge receiver to facilitate mounting the card cartridge to the cartridge receiver when the tab members are in a locking position and disengage the cooperating component of the cartridge receiver when in a release position.

34. The card cartridge of claim 33, wherein the tab members are biased toward the locking position.

35. The card cartridge of claim 33, wherein the latching component includes a shoulder member.

36. The card cartridge of claim 33, wherein the tab members include finger pads.

37. The card cartridge of claim 26, including a stack of cards in the interior cavity.

38. The card cartridge of claim 26, wherein the base includes a card separating member adjacent back wall, whereby card feed operations are improved.

39. The card cartridge of claim 38, wherein the card separating member is a ramp or a curved step member.

40. A card cartridge for use with an identification card printer comprising:
   a housing having an interior cavity that is sized to accommodate a stack of cards; and
   a supply circuit having a memory containing supply information relating to parameters of the card cartridge.

41. The card cartridge of claim 40, wherein the housing includes a pair of opposing side walls, a top, a front wall, a back wall opposite the front wall and a base.

42. The card cartridge of claim 40, wherein the housing includes a card access, through which a card transport mechanism can engage a lead card of an enclosed stack of cards, and a card output slot.

43. The card cartridge of claim 42, wherein the housing includes first and second apertures, which form the card access.

44. The card cartridge of claim 42, wherein the card access is formed in the base of the housing adjacent the supply circuit.

45. The card cartridge of claim 41, wherein the supply circuit is mounted to the base of the housing.

46. The card cartridge of claim 41, including a biasing mechanism adapted to apply a force to an end card of the stack of cards and direct the lead card toward the base.

47. The card cartridge of claim 40, wherein the supply circuit is configured to communicate supply information to the printer over a physical communication link.

48. The card cartridge of claim 40, wherein the supply circuit includes electrical contacts through which the supply information can be accessed.

49. The card cartridge of claim 40, wherein the supply circuit is configured to communicate supply information to the printer over a wireless communication link.

50. The card cartridge of claim 49, wherein the supply circuit wirelessly communicates to the printer using a radio frequency (RF) signal.

51. The card cartridge of claim 40, wherein the supply circuit is further configured to sense proper installation of the card cartridge on a card receiver.

52. The card cartridge of claim 40, wherein the memory of the supply circuit includes supply information related to a card supply identifier, a card type, card dimensions, card features, card identifiers, card orientation, a card count, card supplier information, dealer information, security codes, expiration date and printer settings.

53. The card cartridge of claim 40, wherein the supply circuit is configured to prevent the printer from operating if an improper security code is entered.

* * * * *

UNITED STATES PATENT AND TRADEMARK OFFICE
CERTIFICATE OF CORRECTION

| | | |
|---|---|---|
| PATENT NO. | : 6,932,527 B2 | |
| APPLICATION NO. | : 10/126441 | |
| DATED | : August 23, 2005 | |
| INVENTOR(S) | : Martin A. Pribula et al. | |

It is certified that error appears in the above-identified patent and that said Letters Patent is hereby corrected as shown below:

- -on the title page, should read Item 59, References Cited,
U.S. PATENT DOCUMENTS.

| | | | |
|---|---|---|---|
| 3,755,653 | 8/1973 | Venker | 235/61.11 |
| 4,782,363 | 11/1988 | Britt et al. | 355/14 |
| 5,019,839 | 5/1991 | Watanabe et al. | 346/134 |
| 5,077,467 | 12/1991 | Barron, Jr. et al. | 250/221 |
| 5,530,468 | 06/1996 | Yoshimi et al. | 347/262 |
| 5,642,877 | 7/1997 | Green | 271/35 |
| 5,772,199 | 06/1998 | Green | 271/10.06 |
| 5,820,281 | 10/1998 | Hill et al. | 400/621 |
| 5,882,127 | 3/1999 | Amano | 400/521 |
| 5,978,621 | 11/1999 | Glemser et al. | 399/90 |
| 6,076,9113 | 06/2000 | Garcia et al. | 347/19 |
| 6,179,401 | 1/2001 | Stephens, Jr. et al. | 347/19 |
| 6,253,329 | 06/2001 | Kang | 713/300 |
| 6,341,839 | 1/2002 | Burikov et al. | 347/37 |
| 6,405,055 | 6/2002 | Silverbrook et al. | 455/556 |
| 6,464,317 | 10/2002 | Miyazawa | 347/14 |

FOREIGN PATENT DOCUMENTS
JP 411105359A   4/1999   Japan

OTHER PUBLICATIONS
Streamfeeder - ST 1250 Universal Friction Feeder; last modified February 27, 2000; 1 page with heading of "Streamfeeder - Product Index"; and 3 pages with heading of "Streamfeeder - ST 1250 Universal Friction Feeder"

U.S. PATENT DOCUMENTS
Please replace the following "4,031,518 A, 6/1977, Sweeney et al., 340/172.5" with the following --4,031,518 A, 6/1977, Holloran et al., 710/5".--

UNITED STATES PATENT AND TRADEMARK OFFICE
CERTIFICATE OF CORRECTION

PATENT NO. : 6,932,527 B2
APPLICATION NO. : 10/126441
DATED : August 23, 2005
INVENTOR(S) : Martin A. Pribula et al.

It is certified that error appears in the above-identified patent and that said Letters Patent is hereby corrected as shown below:

Column 10.
Line 41, replace "claim 40" with --claim 49--.

Signed and Sealed this

Fifteenth Day of August, 2006

JON W. DUDAS
*Director of the United States Patent and Trademark Office*

UNITED STATES PATENT AND TRADEMARK OFFICE
CERTIFICATE OF CORRECTION

PATENT NO.       : 6,932,527 B2  
APPLICATION NO. : 10/126441  
DATED            : August 23, 2005  
INVENTOR(S)      : Martin A. Pribula et al.

It is certified that error appears in the above-identified patent and that said Letters Patent is hereby corrected as shown below:

- -on the title page, should read Item 56, References Cited,
U.S. PATENT DOCUMENTS.

| | | | |
|---|---|---|---|
| 3,755,653 | 8/1973 | Venker | 235/61.11 |
| 4,782,363 | 11/1988 | Britt et al. | 355/14 |
| 5,019,839 | 5/1991 | Watanabe et al. | 346/134 |
| 5,077,467 | 12/1991 | Barron, Jr. et al. | 250/221 |
| 5,530,468 | 06/1996 | Yoshimi et al. | 347/262 |
| 5,642,877 | 7/1997 | Green | 271/35 |
| 5,772,199 | 06/1998 | Green | 271/10.06 |
| 5,820,281 | 10/1998 | Hill et al. | 400/621 |
| 5,882,127 | 3/1999 | Amano | 400/521 |
| 5,978,621 | 11/1999 | Glemser et al. | 399/90 |
| 6,076,913 | 06/2000 | Garcia et al. | 347/19 |
| 6,179,401 | 1/2001 | Stephens, Jr. et al. | 347/19 |
| 6,253,329 | 06/2001 | Kang | 713/300 |
| 6,341,839 | 1/2002 | Burikov et al. | 347/37 |
| 6,405,055 | 6/2002 | Silverbrook et al. | 455/556 |
| 6,464,317 | 10/2002 | Miyazawa | 347/14 |

FOREIGN PATENT DOCUMENTS  
JP 411105359A    4/1999    Japan

OTHER PUBLICATIONS  
Streamfeeder - ST 1250 Universal Friction Feeder; last modified February 27, 2000; 1 page with heading of "Streamfeeder - Product Index"; and 3 pages with heading of "Streamfeeder - ST 1250 Universal Friction Feeder"

U.S. PATENT DOCUMENTS  
Please replace the following "4,031,518 A, 6/1977, Sweeney et al., 340/172.5" with the following --4,031,518 A, 6/1977, Holloran et al., 710/5".--

UNITED STATES PATENT AND TRADEMARK OFFICE
CERTIFICATE OF CORRECTION

PATENT NO. : 6,932,527 B2
APPLICATION NO. : 10/126441
DATED : August 23, 2005
INVENTOR(S) : Martin A. Pribula et al.

It is certified that error appears in the above-identified patent and that said Letters Patent is hereby corrected as shown below:

<u>Column 10.</u>
Line 41, replace "claim 40" with --claim 49--.

This certificate supersedes Certificate of Correction issued August 15, 2006.

Signed and Sealed this

Fourteenth Day of November, 2006

JON W. DUDAS
*Director of the United States Patent and Trademark Office*